(12) United States Patent
Erickson et al.

(10) Patent No.: US 11,274,237 B2
(45) Date of Patent: Mar. 15, 2022

(54) ELONGATED ABRASIVE PARTICLES, METHOD OF MAKING THE SAME, AND ABRASIVE ARTICLES CONTAINING THE SAME

(71) Applicant: 3M INNOVATIVE PROPERTIES COMPANY, St. Paul, MN (US)

(72) Inventors: Dwight D. Erickson, Woodbury, MN (US); Negus B. Adefris, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 189 days.

(21) Appl. No.: 16/649,031

(22) PCT Filed: Sep. 14, 2018

(86) PCT No.: PCT/IB2018/057061
§ 371 (c)(1),
(2) Date: Mar. 19, 2020

(87) PCT Pub. No.: WO2019/069157
PCT Pub. Date: Apr. 11, 2019

(65) Prior Publication Data
US 2020/0231851 A1    Jul. 23, 2020

Related U.S. Application Data

(60) Provisional application No. 62/566,694, filed on Oct. 2, 2017.

(51) Int. Cl.
*C09K 3/14* (2006.01)
(52) U.S. Cl.
CPC .................. *C09K 3/1418* (2013.01)

(58) Field of Classification Search
None
See application file for complete search history.

(56) References Cited

U.S. PATENT DOCUMENTS

| 2,127,504 A | 8/1938 | Derr |
| 3,340,205 A | 9/1967 | Hayes |
| (Continued) | | |

FOREIGN PATENT DOCUMENTS

| CN | 101909823 A | 12/2010 |
| CN | 103649010 A | 3/2014 |
| (Continued) | | |

OTHER PUBLICATIONS

Erickson, co-pending U.S. Appl. No. 17/335,513, filed Jun. 1, 2021.
(Continued)

*Primary Examiner* — Pegah Parvini
(74) *Attorney, Agent, or Firm* — Bradford B. Wright

(57) ABSTRACT

A method of making elongated abrasive particles includes five steps. Step 1) includes providing a mold having parallel linear grooves, partially interrupted at predetermined intervals by transverse obstructions. Step 2) includes filling the parallel linear grooves with a flowable abrasive particle precursor composition. Step 3) includes at least partially drying the flowable abrasive particle precursor composition to form an at least partially dried abrasive particle precursor composition. Step 4) includes separating that composition from the mold, thereby forming elongated precursor abrasive particles having a shape corresponding to portions of the parallel linear grooves disposed between the transverse obstructions. At least one of the first and second opposite ends of the elongated precursor abrasive particles comprises both a molded portion and a fractured portion. Step 5) converts the elongated precursor abrasive particles into elongated abrasive particles. Elongated abrasive particles (Continued)

preparable by the method and abrasive articles containing them are also disclosed.

18 Claims, 5 Drawing Sheets

(56) References Cited

U.S. PATENT DOCUMENTS

| | | |
|---|---|---|
| 3,957,598 A | 5/1976 | Merkl |
| 4,314,827 A | 2/1982 | Leitheiser |
| 4,543,107 A | 9/1985 | Rue |
| 4,588,419 A | 5/1986 | Caul |
| 4,623,364 A | 11/1986 | Cottringer |
| 4,741,743 A | 5/1988 | Narayanan |
| 4,744,802 A | 5/1988 | Schwabel |
| 4,751,138 A | 6/1988 | Tumey |
| 4,770,671 A | 9/1988 | Monroe |
| 4,800,685 A | 1/1989 | Haynes, Jr. |
| 4,881,951 A | 11/1989 | Wood |
| 4,898,597 A | 2/1990 | Hay |
| 4,997,461 A | 3/1991 | Markhoff-Matheny |
| 5,011,508 A | 4/1991 | Wald |
| 5,037,453 A | 8/1991 | Narayanan |
| 5,090,968 A | 2/1992 | Pellow |
| 5,094,672 A | 3/1992 | Giles, Jr. |
| 5,110,322 A | 5/1992 | Narayanan |
| 5,110,332 A | 5/1992 | Isaksson |
| 5,118,326 A | 6/1992 | Lee |
| 5,129,919 A | 7/1992 | Kalinowski |
| 5,131,926 A | 7/1992 | Rostoker |
| 5,152,917 A | 10/1992 | Pieper |
| 5,201,916 A | 4/1993 | Berg |
| 5,203,886 A | 4/1993 | Sheldon |
| 5,227,104 A | 7/1993 | Bauer |
| 5,282,875 A | 2/1994 | Wood |
| 5,366,523 A | 11/1994 | Rowenhorst |
| 5,435,816 A | 7/1995 | Spurgeon |
| 5,436,063 A | 7/1995 | Follett |
| 5,498,269 A | 3/1996 | Larmie |
| 5,547,479 A | 8/1996 | Conwell |
| 5,551,963 A | 9/1996 | Larmie |
| 5,672,097 A | 9/1997 | Hoopman |
| 5,725,162 A | 3/1998 | Garg |
| 5,738,696 A | 4/1998 | Wu |
| 5,776,214 A | 7/1998 | Wood |
| 5,863,308 A | 1/1999 | Qi |
| 5,946,991 A | 9/1999 | Hoopman |
| 5,975,987 A | 11/1999 | Hoopman |
| 6,054,093 A | 4/2000 | Torre, Jr. |
| 6,129,540 A | 10/2000 | Hoopman |
| 6,773,475 B2 * | 8/2004 | Ohishi ............... B24B 19/226 451/28 |
| 8,142,531 B2 | 3/2012 | Adefris |
| 8,142,891 B2 | 3/2012 | Culler |
| 9,039,797 B2 | 5/2015 | Erickson |
| 2009/0169816 A1 | 7/2009 | Erickson et al. |
| 2010/0146867 A1 | 6/2010 | Boden |
| 2011/0314746 A1 | 12/2011 | Erickson |
| 2015/0267097 A1 * | 9/2015 | Rosenflanz ......... C09K 3/1409 451/28 |
| 2016/0068729 A1 | 3/2016 | Erickson |
| 2016/0289520 A1 | 10/2016 | Bujnowski |
| 2019/0106362 A1 | 4/2019 | Erickson |

FOREIGN PATENT DOCUMENTS

| | | |
|---|---|---|
| CN | 104136172 A | 11/2014 |
| CN | 104254429 A | 12/2014 |
| CN | 104540639 A | 4/2015 |
| CN | 104768710 A | 7/2015 |
| CN | 105829025 A | 8/2016 |
| CN | 106163743 A | 11/2016 |
| EP | 2644078 A2 | 10/2013 |
| GB | 1193258 | 5/1970 |
| WO | WO 2012-061033 | 5/2012 |
| WO | WO 2014-165390 | 10/2014 |
| WO | WO 2015-100018 | 7/2015 |
| WO | WO 2017-172470 | 10/2017 |

OTHER PUBLICATIONS

Erickson, co-pending U.S. Appl. No. 17/335,439, filed Jun. 1, 2021.
International Search Report for PCT International Application No. PCT/IB2018/057061, dated Dec. 19, 2018, 7 pages.

* cited by examiner

ELONGATED ABRASIVE PARTICLES, METHOD OF MAKING THE SAME, AND ABRASIVE ARTICLES CONTAINING THE SAME

TECHNICAL FIELD

The present disclosure broadly relates to elongated abrasive particles, methods of making them, and abrasive article containing them.

BACKGROUND

Extruded rod-shaped abrasive particles (e.g., alumina particles) have been around for years. They can be formed, for example, by extrusion of a dispersion or slurry of the abrasive precursor material. The extruded material is cut or broken to desired lengths, and then fired. In those applications in which the resultant abrasive material is alpha alumina, fine alpha alumina particles and/or particles of an alpha alumina precursor (e.g., a boehmite sol-gel) are used. The resulting elongated abrasive particles can be used, for example, in grinding wheels; for use in use in heavy duty snagging operations.

However, when produced by extrusion, the abrasive filaments tend to bend and lose their shape, and extrusion of fine-diameter (e.g., less than about ANSI size 16 grit) filaments may present technical difficulties in order to extrude through the smaller diameter orifices.

SUMMARY

The non-uniformity of commercially available extruded abrasive filaments can lead to batch inconsistencies that result in difficulty in controlling variables such as porosity in bonded abrasive articles. Advantageously, methods and elongated abrasive particles according to the present disclosure are capable of overcoming that problem.

In a first aspect, the present disclosure provides a method of making elongated abrasive particles, the method comprising:

providing a mold having parallel linear grooves, wherein the parallel linear grooves are partially interrupted at predetermined intervals by transverse obstructions;

filling at least a portion of the parallel linear grooves with a flowable abrasive particle precursor composition, wherein the flowable abrasive particle precursor composition is confined within at least one of the parallel linear grooves;

at least partially drying the flowable abrasive particle precursor composition to form an at least partially dried abrasive particle precursor composition;

separating the at least partially dried abrasive particle precursor composition from the mold, thereby forming elongated precursor abrasive particles having a shape corresponding to portions of the parallel linear grooves disposed between the transverse obstructions, wherein the predetermined intervals correspond to lengths of the elongated precursor abrasive particles, and wherein at least one of the first and second opposite ends of the elongated precursor abrasive particles comprises both a molded portion and a fractured portion; and converting the elongated precursor abrasive particles into the elongated abrasive particles.

In a second aspect, the present disclosure provides elongated abrasive particles comprising a ceramic body bounded by at least two longitudinally-oriented contiguous surfaces, and first and second ends separated by the at least two longitudinally-oriented surfaces, wherein at least one of the first and second ends comprises both a molded portion and a fractured portion.

As used herein:

the term "aspect ratio" refers to the ratio of average length to average thickness;

the adjective "elongated" means having an aspect ratio of at least 2;

the term "fractured surface" refers to a surface formed by a fracturing process (e.g., it may be characterized by abrupt features, striations, and/or cleavage planes);

the term "mold surface" refers to a surface that formed through a molding process and has the complementary shape to the mold surface used to produce it;

the term "isolated" used in reference to parallel linear grooves, means that the parallel linear grooves are not interconnected by intersecting grooves (e.g., a lattice pattern) or molding flash due to overfilling;

the term "length" refers to the longest dimension of an object;

the term "width" refers to the longest dimension of an object that is perpendicular to its length;

the term "thickness" refers to the longest dimension of an object that is perpendicular to both of its length and width; and the terms "shaped abrasive precursor particle" and "shaped abrasive particle" refer, respectively, to an abrasive precursor particle, or an abrasive particle, having a shape at least partially determined by a mold (e.g., an open face mold) used in its manufacture (e.g., it is determined by the shape of a corresponding mold cavity used in its manufacture).

Features and advantages of the present disclosure will be further understood upon consideration of the detailed description as well as the appended claims.

Figure 1A:
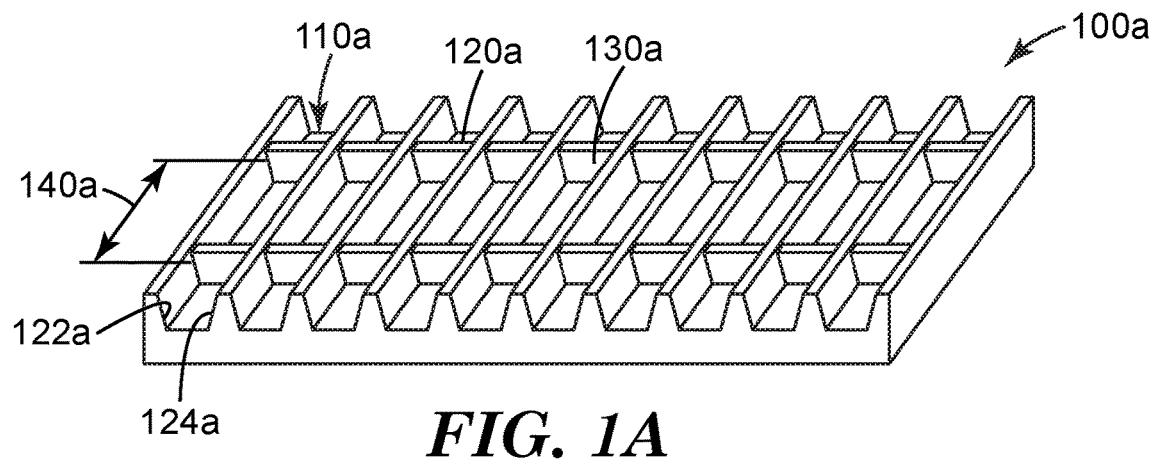
FIGS. 1A-1E are schematic perspective views of respective molds 100a-100e that are useful for making elongated abrasive particles according to the present disclosure.

Repeated use of reference characters in the specification and drawings is intended to represent the same or analogous features or elements of the disclosure. It should be understood that numerous other modifications and embodiments can be devised by those skilled in the art, which fall within

DETAILED DESCRIPTION

Methods according to the present disclosure method for making elongated abrasive particles may include a number of steps carried out sequentially. It is not necessary that any of the steps be carried out consecutively, although in some embodiments it may be preferred to carry out at least some (or even all) of the sequential steps consecutively.

In the first step a mold is provided. The mold has a plurality of isolated parallel linear grooves disposed on a major surface thereof. Individual linear grooves may be different with respect to width, length, cross-sectional profile, and/or depth. In preferred embodiments, all of the grooves are identical. In general, the linear grooves are open at the surface of the mold, and the ends of grooves extend across the mold surface to the sides, where they may be open or closed (preferably open) at their ends. Preferably, the linear grooves have constant cross-sectional shape and area along their lengths, although this is not a requirement. In order to form elongated abrasive precursor particles, the longitudinal distance between the transverse obstructions within each groove should be at least twice the width and/or depth of the groove. For example, the groove segments between transverse obstructions may have an aspect ratio of at least 2, preferably at least 5, at least 10, at least 15, at least 20, at least 30, at least 40, at least 50, or even more. FIGS. 1A-1E illustrate exemplary suitable mold configurations with parallel linear grooves. For example, in FIG. 1A, mold 100a has parallel linear grooves 110a with two sloping planar surfaces 122a, 124a contacting a flat bottom 120a. Parallel linear grooves 110a are partially interrupted at predetermined intervals 140a by transverse obstructions 130a extending from two sloping planar surfaces 122a, 124a.

Figure 1B:
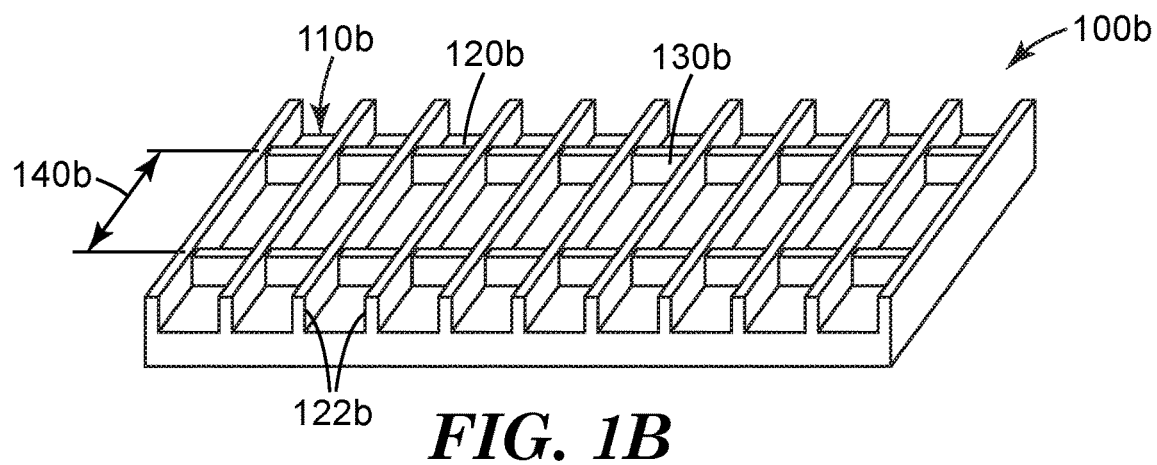

In FIG. 1B, mold 100b has parallel linear grooves 110b with bottoms 120b with a rectangular transverse cross-sectional shape. Parallel linear grooves 110b are partially interrupted at predetermined intervals 140b by transverse obstructions 130b.

Figure 1C:
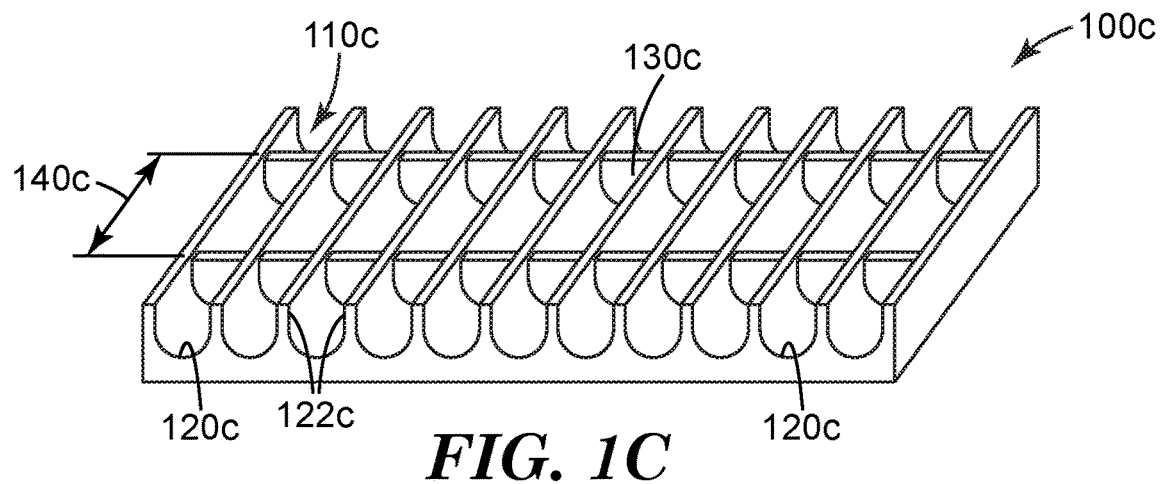

In FIG. 1C, mold 100c has parallel linear grooves 110c, each having two parallel planar surfaces 122c contacting a rounded bottom 120c. Parallel linear grooves 110c are partially interrupted at predetermined intervals 140c by transverse obstructions 130c.

Figure 1D:
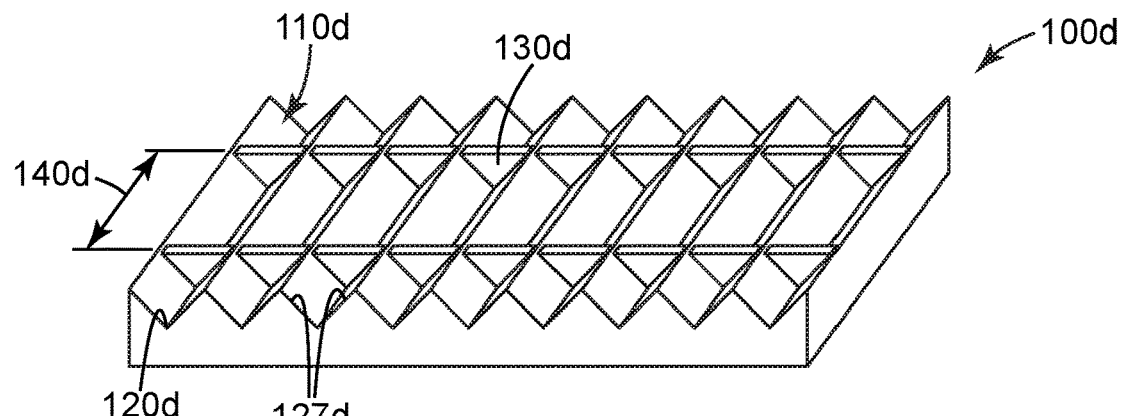

In FIG. 1D, mold 100d has parallel linear grooves 110d with two sloping planar surfaces 127d that meet at a V-shaped bottom 120d. Parallel linear grooves 110d are partially interrupted at predetermined intervals 140d by transverse obstructions 130d.

Figure 1E:
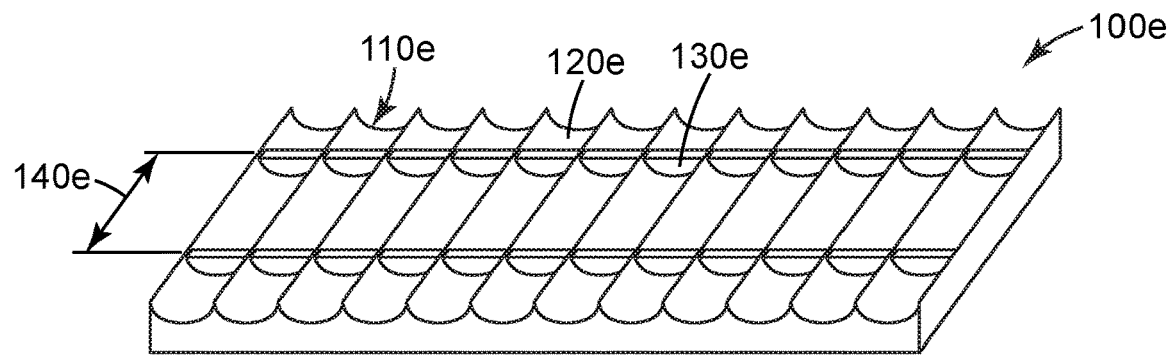

In FIG. 1E, mold 100e has parallel linear grooves 110e with rounded bottoms 120e with a generally semicircular transverse cross-sectional shape. Parallel linear grooves 110e are partially interrupted at predetermined intervals 140e by transverse obstructions 130e.

In a second step, at least a portion of the plurality of isolated open-ended grooves are filled with a flowable abrasive particle precursor composition comprising an abrasive particle precursor material and a volatile liquid. The flowable abrasive particle precursor material may comprise at least one of alpha alumina fine particles or an alpha alumina precursor material.

In some embodiments, useful abrasive particle precursor materials include fine abrasive particles that, upon sintering, form a single abrasive particle. In some preferred embodiments, the abrasive particle precursor materials material may comprise, alone or in addition, fine alpha alumina particles that upon sintering fuse together to form a sintered alpha alumina ceramic body, e.g., as disclosed in U. S. Publ. Pat. Appln. No. 2016/0068729 A1 (Erickson et al.).

In such embodiments, the milled abrasive particles may be present as a slurry in a volatile liquid vehicle, which may optionally contain one or more additives such as, for example, thickener(s), thixotrope(s), dispersant(s), or dispersant(s).

Exemplary alpha alumina precursor materials include: transitional aluminas (e.g., boehmite, diaspore, gibbsite, bayerite, nordstrandite); aluminum salts and complexes such as, for example, basic aluminum carboxylates (e.g., basic aluminum carboxylates of the general formula $Al(OH)_y$ (carboxylate)$_{3-y}$, where y is between 1 and 2, preferably between 1 and 1.5, and the carboxylate counterion is selected from the group consisting of formate, acetate, propionate, and oxalate, or combinations of these carboxylates, aluminum formoacetate, and aluminum nitroformoacetate); basic aluminum nitrates; partially hydrolyzed aluminum alkoxides; and combinations thereof. Basic aluminum carboxylates can be prepared by digesting aluminum metal in a solution of the carboxylic acid as described in U.S. Pat. No. 3,957,598 (Merkl). Basic aluminum nitrates can also be prepared by digesting aluminum metal in a nitric acid solution as described in U.S. Pat. No. 3,340,205 (Hayes et al.) or British Pat. No. 1,193,258 (Fletcher et al.), or by the thermal decomposition of aluminum nitrate as described in U.S. Pat. No. 2,127,504 (Den et al.). These materials can also be prepared by partially neutralizing an aluminum salt with a base. The basic aluminum nitrates have the general formula $Al(OH)_z(NO_3)_{3-z}$, where z is from about 0.5 to 2.5.

Exemplary commercially available boehmites include, for example, those commercially available under the trade designation "HIQ" (e.g., HIQ-9015) from BASF Corp., Florham Park, N.J., and those commercially available under the trade designations "DISPERAL", "DISPAL", and "CATAPAL D" from Sasol North America, Houston, Tex. The flowable abrasive particle precursor material should typically comprise a sufficient amount of the liquid vehicle for the viscosity of the composition to be sufficiently low to enable filling the mold cavities, but not so much liquid as to cause subsequent removal of the liquid from the mold cavities to be prohibitively expensive. Further details regarding alpha alumina precursors, including methods for making them and converting them into alpha alumina abrasive particles, can be found, for example, in U.S. Pat. No. 4,314,827 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 5,011,508 (Wald et al.); U.S. Pat. No. 5,090,968 (Pellow); U.S. Pat. No. 5,201,916 (Berg et al.); U.S. Pat. No. 5,227,104 (Bauer); U.S. Pat. No. 5,366,523 (Rowenhorst et al.); U.S. Pat. No. 5,547,479 (Conwell et al.); U.S. Pat. No. 5,498,269 (Larmie); U.S. Pat. No. 5,551,963 (Larmie); U.S. Pat. No. 5,725,162 (Garg et al.); U.S. Pat. No. 5,776,214 (Wood); U.S. Pat. No. 8,142,531 (Adefris et al.); and U.S. Pat. No. 8,142,891 (Culler et al.).

In one exemplary embodiment, the flowable abrasive particle precursor material comprises a sol-gel composition comprises from 2 to 90 weight percent of an alpha alumina precursor material (e.g., aluminum oxide monohydrate (boehmite)), and at least 10 weight percent, from 50 to 70 weight percent, or 50 to 60 weight percent, of volatile components such as water. In some embodiments, the sol-gel composition contains from 30 to 50 weight percent, or 40 to 50 weight percent of the alpha alumina precursor material. As used herein, the term "sol-gel composition" refers to a colloidal dispersion of solid particles in a liquid that forms a three-dimensional network of the solid particles on heating over a period of time, or removal of some of the liquid. In some cases, gel formation may be induced by addition of polyvalent metal ions.

A peptizing agent can be added to the sol-gel composition to produce a more stable hydrosol or colloidal sol-gel composition. Suitable peptizing agents are monoprotic acids or acid compounds such as acetic acid, hydrochloric acid, formic acid, and nitric acid. Multiprotic acids can also be used but they can rapidly gel the sol-gel composition, making it difficult to handle or to introduce additional components thereto. Some commercial sources of boehmite contain an acid titer (such as absorbed formic or nitric acid) that will assist in forming a stable sol-gel composition.

Seed particles and/or crystal grain size modifiers may optionally be added to the sol-gel composition, but advantageously they are typically not needed in order to achieve small alpha alumina crystal grain sizes. Examples of optional alumina grain size modifiers include $Li_2O$, $Na_2O$, MgO, $SiO_2$, CaO, SrO, $TiO_2$, MnO, $Cr_2O_3$, $Fe_2O_3$, CoO, NiO, ZnO, $ZrO_2$, $SnO_2$, $HfO_2$, rare earth oxides (e.g., $La_2O_3$, $CeO_2$, $Pr_2O_3$, $Nd_2O_3$, $Sm_2O_3$, $Eu_2O_3$, $Gd_2O_3$, $Dy_2O_3$, $Er_2O_3$, $Yb_2O_3$, $TbO_2$, $Y_2O_3$), combinations thereof, and precursors thereof. In some embodiments, the flowable abrasive particle precursor material, and hence the corresponding ceramic abrasive particles, are essentially free of any or all of the foregoing and/or other alumina grain size modifiers.

The alpha alumina precursor material may be "seeded" with particles having the same crystal structure as, and lattice parameters as close as possible to, those of alpha alumina. The "seed" particles are added in as finely divided form as possible, and are dispersed uniformly throughout the sol or gel. Seed particles can be added ab initio or it can be formed in situ. The function of seed particles is to cause the transformation to the alpha form to occur uniformly throughout the alpha alumina precursor at a much lower temperature than is needed in the absence of the seed. Suitable seeds include alpha alumina itself and also other compounds such as alpha ferric oxide, chromium suboxide, nickel titanate and a plurality of other compounds that have lattice parameters sufficiently similar to those of alpha alumina to be effective to cause the generation of alpha alumina from a precursor at a temperature below that at which the conversion normally occurs in the absence of such seed. Examples of suitable seed particles include particles of $Ti_2O_3$, $MgO.TiO_2$, $FeO.TiO_2$, $NiO.TiO_2$, $CoO.TiO_2$, $MnO.TiO_2$, $ZnO.TiO_2$, $V_2O_3$, $Ga_2O_3$, $Rh_2O_3$, alpha-$Al_2O_3$, alpha-$Cr_2O_3$, and alpha-$Fe_2O_3$ particles, preferably having an average particle size of from about 10 nm to about 120 nanometers, although other sizes may be used. In some embodiments, the precursor particles, and likewise the derived ceramic abrasive particles, are essentially free of seed particles such as, for example, alpha-$Al_2O_3$ seed particles, alpha-$Cr_2O_3$ seed particles, or alpha-$Fe_2O_3$ seed particles.

Sol-gel compositions can be formed by any suitable means, such as, for example, simply by mixing aluminum oxide monohydrate with water containing a peptizing agent or by forming an aluminum oxide monohydrate slurry to which the peptizing agent is added. Defoamers and/or other suitable chemicals can be added to reduce the tendency to form bubbles or entrain air while mixing. Additional chemicals such as wetting agents, alcohols, and/or coupling agents can be added if desired.

The flowable abrasive particle precursor composition may have any suitable form and/or composition, but preferably comprises a sol-gel composition (i.e., a dispersion of colloidal ceramic precursor particles), a slurry, or other viscous solution. Exemplary volatile liquids include, water, alcohols (e.g., methanol, ethanol, propanol), ethers (e.g., glyme, diglyme), ketones, ether alcohols (e.g., 2-methoxyethanol), and ester alcohols. Preferably, the volatile liquid comprises at least 5 percent, at least 20 percent, at least 40 percent, at least 60 percent, at least 80 percent, or even 100 percent by weight of water.

The flowable abrasive particle precursor composition may be introduced into the grooves by any desired means. Flood coating, roll coating, or curtain coating may be used to introduce the flowable abrasive particle precursor composition into the grooves, for example. In general, the viscosity of the flowable abrasive particle precursor composition should be sufficiently high that excessive loss of material from the grooves does not occur before removal of the volatile liquid. The linear grooves may be at least partially, preferably completely, filled with the flowable abrasive particle precursor composition using any suitable technique. In some embodiments, a knife roll coater or vacuum slot die coater can be used. The grooves should be filled sufficiently that the flowable abrasive particle precursor material is continuous and past the obstructions. On the other hand, excess material caused by overfilling (e.g., resulting in mold flash) is preferably to be minimized or avoided, although a minor amount that does not bridge adjacent linear grooves may be tolerated. If this happens, a scraper, squeegee, or leveler bar may be used to remove excess flowable abrasive particle precursor composition.

A mold release compound can be used to aid in removing the particles from the mold if desired. Typical mold release agents include, for example, oils such as peanut oil or mineral oil, fish oil, silicones, polytetrafluoroethylene, zinc stearate, and graphite. In a third step, at least some of the volatile liquid is removed thereby at least partially drying the flowable abrasive particle precursor composition to form an at least partially dried abrasive particle precursor composition. Volatile liquid may be removed, for example, by evaporation using heat, infrared radiation, and/or forced air. A sufficient amount of the volatile liquid should typically be removed such that the flowable abrasive particle precursor composition in the grooves forms elongated precursor abrasive particles if removed from the mold. During this process, in some embodiments, the exposed surface of the flowable abrasive particle precursor composition may depress toward its center thereby forming a rounded channel that is concave along its length. In other embodiments, it may remain essentially planar. Preferably, the volatile components are removed at a fast evaporation rate, although this is not a requirement. In some embodiments, removal of the volatile component by evaporation occurs at temperatures above the boiling point of the volatile component. The upper limit to the drying temperature often depends on the material the mold is made from. The amount of the volatile liquid removed will typically vary depending on the composition of the molding liquid. For example, at least 10 percent, at least 30 percent, at least 50 percent, at least 70 percent, at least 90 percent, or even at least 99 percent by weight of the volatile liquid composition is removed.

In a fourth step, the at least partially dried abrasive particle precursor composition is separated from the mold (e.g., by vibration, forced air, vacuum, and or flexing), thereby forming elongated precursor abrasive particles having a shape corresponding to portions of the parallel linear grooves disposed between the transverse obstructions. The elongated precursor abrasive particles have lengths corresponding to the predetermined intervals of the mold used to make them. At this point in the process, at least one of the first and second opposite ends of the elongated precursor abrasive particles comprises both a molded portion and a fractured portion.

In a fifth step, at least a portion of the elongated precursor abrasive particles produced above are converted; for example, by optional calcining followed by sintering into the elongated abrasive particles. Typically, this results in elongated abrasive particles, wherein at least one of the first and second opposite ends of the elongated abrasive particles comprises both a molded portion and a fractured portion; however, these end features may be reduced or eliminated during the processes of handling, optional calcining, and/or sintering. For example, fractured surfaces may become smoother and protrusions may break off.

Depending on the converting process, the molds may comprise various materials. If combustion is required, then the mold should be combustible, otherwise it may be made of noncombustible material (e.g., metal, ceramic, glass). Exemplary combustible materials include polymeric organic materials. Examples of suitable polymeric organic materials include thermoplastics such as polyesters, polycarbonates, poly(ether sulfone), poly(methyl methacrylate), polyurethanes, poly(vinyl chloride), polyolefins, polystyrene, polypropylene, polyethylene, combinations of the foregoing, and thermosetting materials. The mold can have a generally planar bottom surface and a plurality of mold cavities, which may be in a production tool. The production tool can be a belt, a sheet, a continuous web, a coating roll (e.g., a rotogravure roll), a sleeve mounted on a coating roll, or die (e.g., a thread rolling die). The production tool may comprise a polymeric material. In one embodiment, the tooling is made from a polymeric or thermoplastic material. In another embodiment, the surfaces of the tooling in contact with the sol-gel while drying, such as the surfaces of the plurality of cavities, comprise a polymeric material while other portions of the tooling can be made from other materials. A suitable coating may be applied to a metal tooling to change its surface tension properties by way of example.

The mold can be made by replication from a master tool, for example, according to known methods. Preferably, the mold is obtained from a commercial source, which may be marketed for a completely unrelated application (e.g., architectural model siding).

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. Further detail concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Molds useful in practice of the present disclosure have isolated parallel linear grooves, typically extending between edges of the mold surface. The grooves may have any transverse cross-sectional profile. Examples include, rectangular, triangular, trapezoidal, rounded (e.g., generally semi-circular), and combinations thereof. Importantly, the parallel linear grooves are independent of one another. For example, the grooves are not fluidly connected to other grooves (e.g., as in a lattice groove structure).

Figure 2:
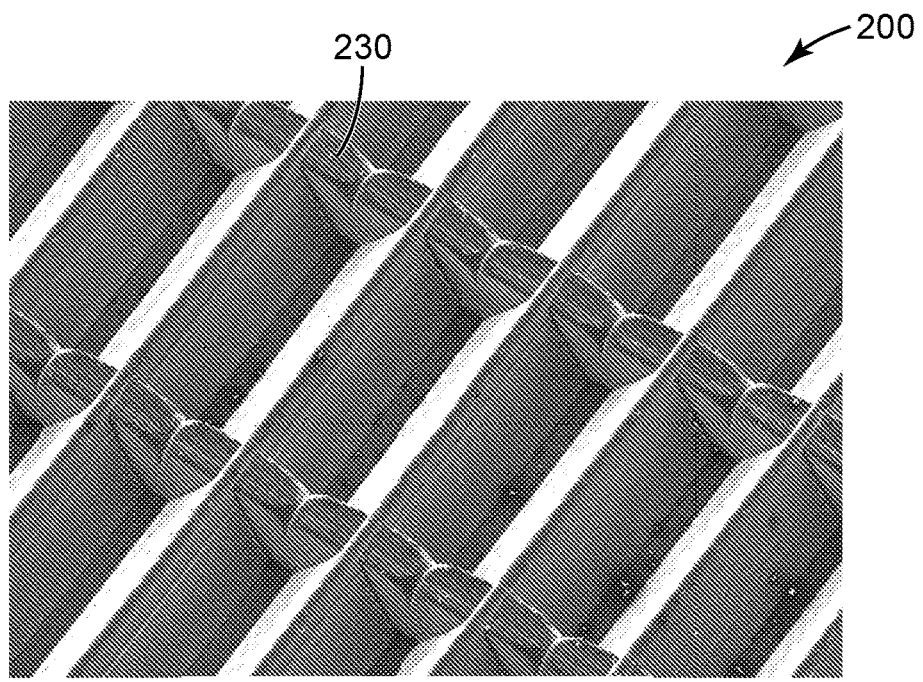
FIG. 2 is a scanning electron micrograph of exemplary tool used to make elongated precursor abrasive particle 300 in FIGS. 3A-3C, and elongated abrasive particle 400 in FIGS. 4A-4B.

The major surface(s) (i.e., longitudinal wall(s)) of the grooves are preferably smooth and shaped (e.g., precisely shaped) so as not to mechanically entrap the elongated abrasive particle precursor. The transverse obstructions may have any functional shape. For example, they may be bumps, ridges, or walls, which may extend inwardly from the bottom or side(s) of the linear grooves (e.g., see FIGS. 1A-1E). The transverse obstructions only partially obstruct the grooves, so they should not extend the full height and width of the grooves. In some cases, the transverse obstructions may have complex shapes. Referring now to FIG. 2, exemplary tool 200 has obstructions 230 with bifurcated shapes due to defects in the extrusion process used in the tool preparation. Preferably, the transverse obstructions obstruct at least 20 percent, at least 30 percent, at least 40 percent, at least 50 percent, or even at least 60 percent of the transverse cross-section area of the grooves, although other amounts may also be used. Likewise, the transverse obstructions preferably obstruct less than 90 percent, less than 80 percent, less than 70 percent, less than 60 percent, or even less than 50 percent of the transverse cross-section area of the grooves, although other amounts may also be used. At least one of the first and second ends has a molded portion and a fractured portion. In general, ends corresponding to the transverse obstructions open will be fractured either in forming the elongated precursor abrasive particle or after sintering to from the elongated abrasive particle. Depending on the lengths of the grooves and the resultant elongated shaped ceramic bodies, the fraction of elongated abrasive particles produced having two fractured ends may varying. In preferred embodiments, the fraction of elongated shaped ceramic bodies having two fractured ends may be at least 50 percent by weight, 60 percent by weight, 70 percent by weight, 80 percent by weight, 90 percent by weight, 95 percent by weight, or even 99 percent by weight. If elongated shaped ceramic bodies corresponding to those formed at the ends of the grooves are removed, then all of the elongated shaped ceramic bodies may have two fractured ends, for example. In some cases, it may be possible to fracture at least partially dried molding material extending beyond the ends of grooves (e.g., if the mold rests on a platen that extends beyond the ends of the grooves), in which case, all of the elongated shaped ceramic bodies may also have two fractured ends.

Elongated abrasive particles made according to the present disclosure can be incorporated into an abrasive article, or used in loose form. Elongated abrasive particles are generally graded to a given particle size distribution before use. Such distributions typically have a range of particle sizes, from coarse particles to fine particles. In the abrasives art, this range is sometimes referred to as a "coarse", "control", and "fine" fractions. Elongated abrasive particles graded according to abrasive industry accepted grading standards specify the particle size distribution for each nominal grade within numerical limits. Such industry accepted grading standards (i.e., abrasive industry specified nominal grade)

include those known as the American National Standards Institute, Inc. (ANSI) standards, Federation of European Producers of Abrasive Products (FEPA) standards, and Japanese Industrial Standard (JIS) standards.

Due to the ratio of the length to the width of some elongated abrasive particles, it may be preferred to size the particles based on the average particle width ("$W_{avg}$"), the average particle length ("$L_{avg}$"), and/or the ratio $L_{avg}/W_{avg}$. For example, they may have values of: $W_{avg}=1110\pm55$ microns and $L_{avg}/W_{avg}=1.5$ to 3.5; $W_{avg}=890\pm45$ microns and $L_{avg}/W_{avg}=1.5$ to 3.5; $W_{avg}=510\pm26$ microns and $L_{avg}/W_{avg}=2.9$ to 4.5; $W_{avg}=340\pm17$ microns and $L_{avg}/W_{avg}=3.1$ to 4.9; $W_{avg}=240\pm12$ microns and $L_{avg}/W_{avg}=3.3$ to 5.1; $W_{avg}=240\pm12$ microns and $L_{avg}/W_{avg}=3.3$ to 5.1; $W_{avg}=194\pm7$ microns and $L_{avg}/W_{avg}=3.3$ to 5.1; $W_{avg}=146\pm6$ microns and $L_{avg}/W_{avg}=3.3$ to 5.1; $W_{avg}=132\pm5$ microns and $L_{avg}/W_{avg}=3.3$ to 5.1.

The width of the elongated abrasive particles may be of any desired dimension. For example, in some embodiments, the width may be at least 100 microns, at least 150 microns, at least 200 microns, at least 250 microns, at least 500 microns, at least 1000 microns. Likewise, in some embodiments, the width may be, for example, less than 2500 microns, less than 1500 microns, less than 1000 microns, less than 500 microns, less than 400 microns, less than 300 microns, or less than 200 microns.

Elongated abrasive particles according to the present disclosure can be used in combination with other abrasive particles (e.g., crushed abrasive particles) if desired. Elongated abrasive particles according to the present disclosure may be used in a loose form or slurry, and/or incorporated into abrasive products (e.g., bonded abrasives, coated abrasives, and nonwoven abrasives). Criteria used in selecting elongated abrasive particles used for a particular abrading application typically include: abrading life, rate of cut, substrate surface finish, grinding efficiency, and product cost.

In one preferred embodiment, the elongated precursor abrasive particles are separated from the mold, optionally fractured and graded to a desired size distribution, and converted into elongated abrasive particles by calcining (an optional step), and sintering at elevated temperature. If not previously fractured (e.g., at the elongated precursor abrasive particle stage), the elongated abrasive particles can be fractured and graded to a desired size distribution. The elongated precursor abrasive particles can be removed from the grooves by gravity, vibration, ultrasonic vibration, vacuum, or pressurized air, for example. If desired, the elongated precursor abrasive particles can be further dried outside of the mold. Optionally, but preferably, the elongated precursor abrasive particles are calcined at a temperature of from 500° C. to 800° C. for sufficient time (e.g., several hours) to remove bound water and increase durability in handling. This results in calcined elongated precursor bodies. Sintering may be accomplished in an oven or kiln as described in U.S. Pat. No. 8,142,531 (Adefris et al.), or by passage through a flame as described in PCT International Appln. Publ. No. WO 2014/165390 A1 (Erickson et al.).

In another preferred embodiment, the elongated precursor abrasive particles are left in the mold (which is made of combustible material), which is heated to burn off the mold and convert them into the elongated abrasive particles by calcining (an optional step), and sintering at elevated temperature. Elongated abrasive particles according to the present disclosure comprise an elongated shaped ceramic body having opposed first and second ends joined to each other by at least two longitudinal surfaces. At least one of the first and second ends, preferably both ends, has a molded portion and a fractured portion.

Figure 3A:
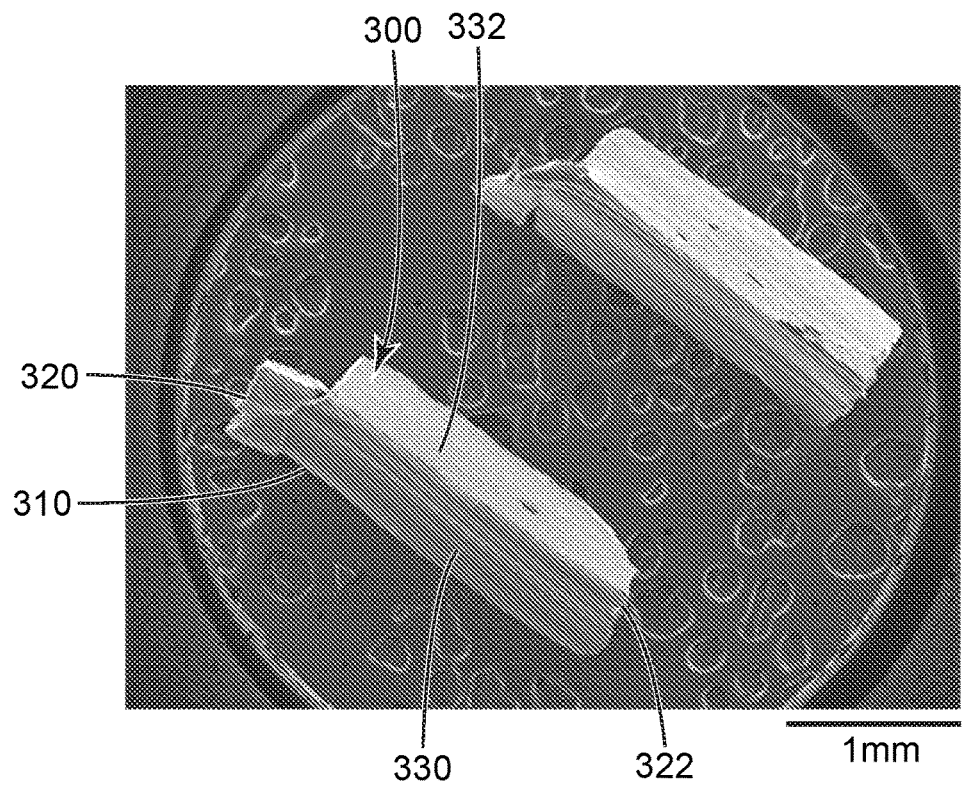
FIG. 3A is a scanning electron micrograph of exemplary elongated precursor abrasive particle 200 prepared according to the present disclosure.
Figure 3B:
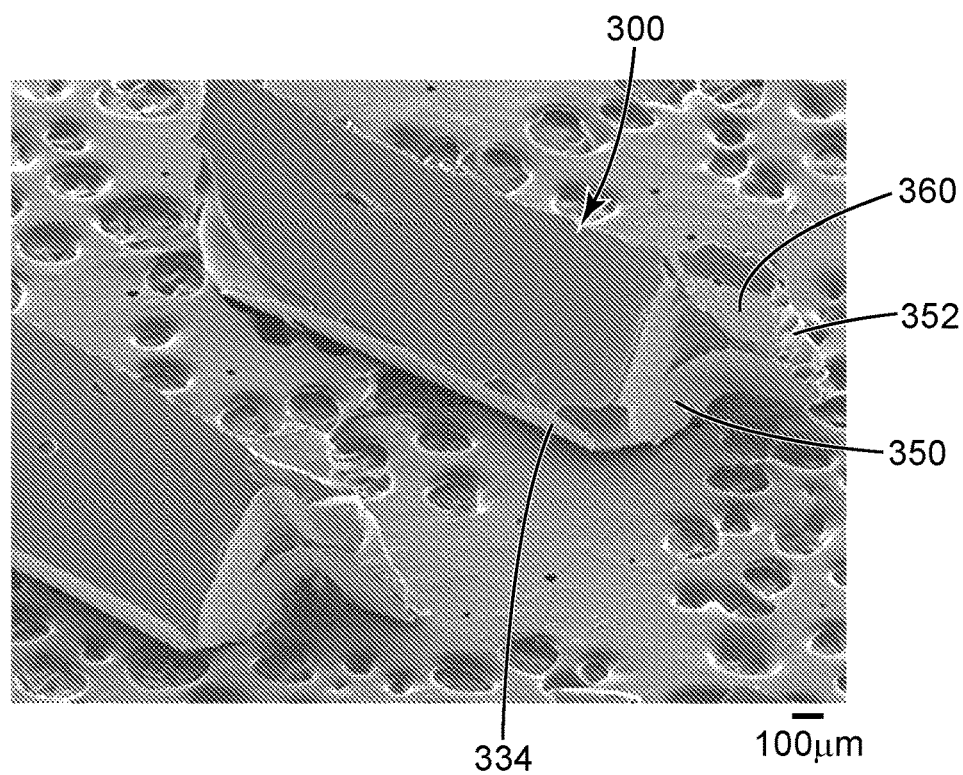
FIG. 3B is a higher magnification scanning electron micrograph of end 320 in FIG. 3A.

Referring now to FIG. 3A, exemplary elongated precursor abrasive particle 300 has an elongated shaped ceramic body 310 having opposed first and second ends 320, 322 that are separated by, and joined to, each other by three longitudinally-oriented contiguous outer surfaces 330, 332, 334 (see FIG. 3B). End 320 has both a molded portion 350 and a fractured portion 352 that comprises a projection 360 (see FIG. 3B). Elongated precursor abrasive particle 300 has trapezoidal transverse shape.

Figure 4A:
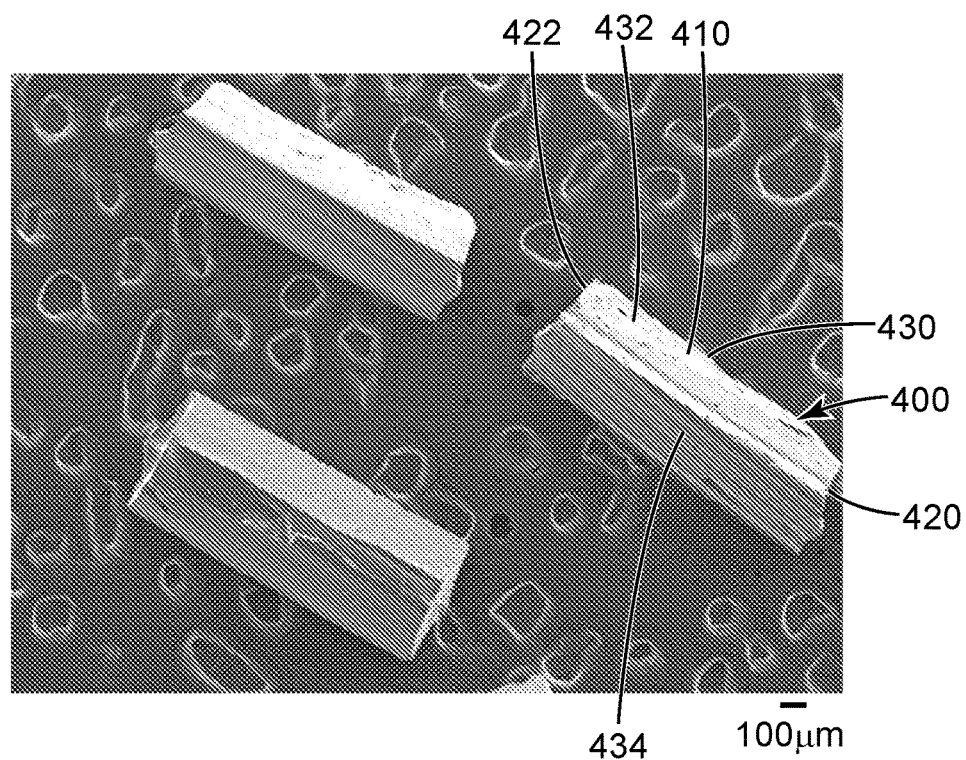
FIG. 4A is a scanning electron micrographs of exemplary elongated abrasive particle 400 prepared according to the present disclosure.
Figure 4B:
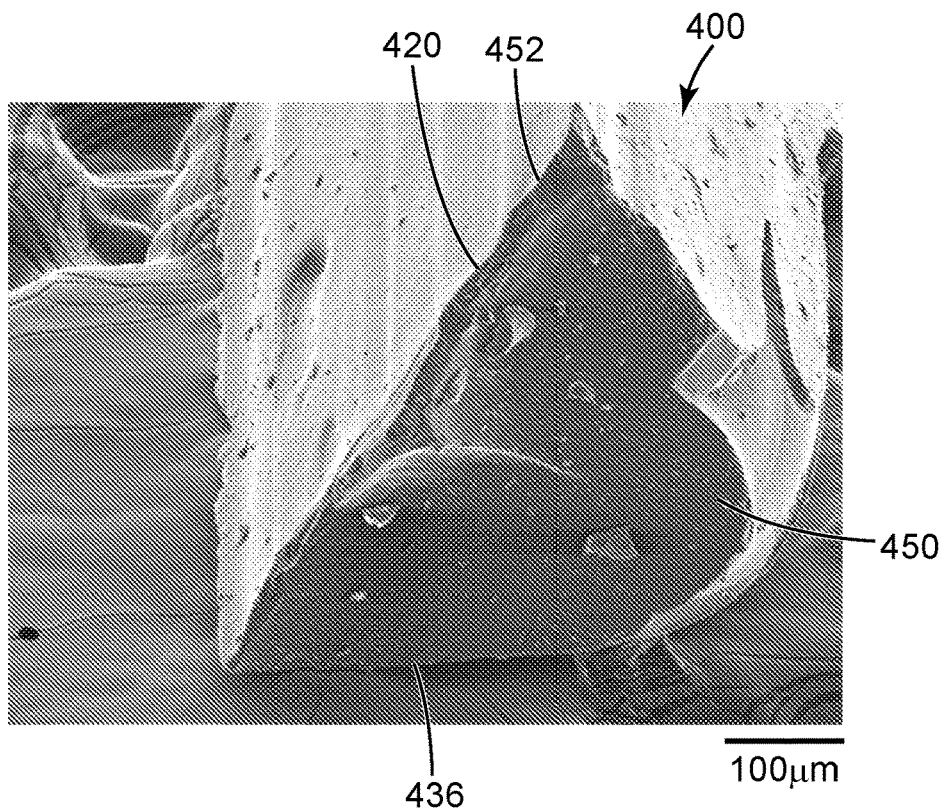
FIG. 4B is an enlarged end view of elongated abrasive particle 400.

Referring now to FIG. 4A, exemplary elongated abrasive particle 400 has an elongated shaped ceramic body 410 having opposed first and second ends 420, 422 that are separated by, and joined to, each other by four longitudinally-oriented contiguous outer surfaces 430, 432, 434, 436 (see FIG. 4B, see also FIG. 1A for mold used to make elongated abrasive particle 400). Referring now to FIG. 4B, end 420 has both a molded portion 450 and a fractured portion 452, which comprises a projection 460. Elongated abrasive particle 200 has trapezoidal transverse cross-sectional shape.

The elongated abrasive particles and their elongated precursor abrasive particles may have an aspect ratio of at least 2. In some embodiments, the elongated abrasive particles and their elongated precursor abrasive particles may have an aspect ratio of at least 4, at least 6, or even at least 10.

The present disclosure further provides a method of abrading a surface. The method comprises contacting an elongated abrasive particle and/or abrasive article (e.g., a bonded abrasive wheel), according to the present disclosure, with a surface of a workpiece; and moving at least one of the elongated abrasive particles or the contacted surface to abrade at least a portion of the surface with the elongated abrasive particle and/or abrasive article. Methods for abrading with elongated abrasive particles made according to the present disclosure range from snagging (i.e., high pressure high stock removal) to polishing (e.g., polishing medical implants with coated abrasive belts), wherein the latter is typically done with finer grades of elongated abrasive particles. The elongated abrasive particles may also be used in precision abrading applications, such as grinding cam shafts with vitrified bonded wheels. The size of the elongated abrasive particles used for a particular abrading application will be apparent to those skilled in the art.

Abrading with elongated abrasive particles according to the present disclosure may be done dry or wet. For wet abrading, the liquid may be introduced in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Elongated abrasive particles made according to the present disclosure may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Bonded abrasive articles typically include a shaped mass of abrasive particles (e.g., elongated abrasive particles according to the present disclosure) held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g., double disc grinder) or other conventional bonded abrasive shape. Bonded abrasive articles typically comprise about 3-50 percent by volume of bond material, about 30-90 percent by volume of the elongated abrasive particles (or a blend thereof of with crushed abrasive particles), up to 50 percent by volume additives (including grinding aids), and up to 70 percent by volume pores, based on the total volume of the bonded abrasive article.

Figure 5:
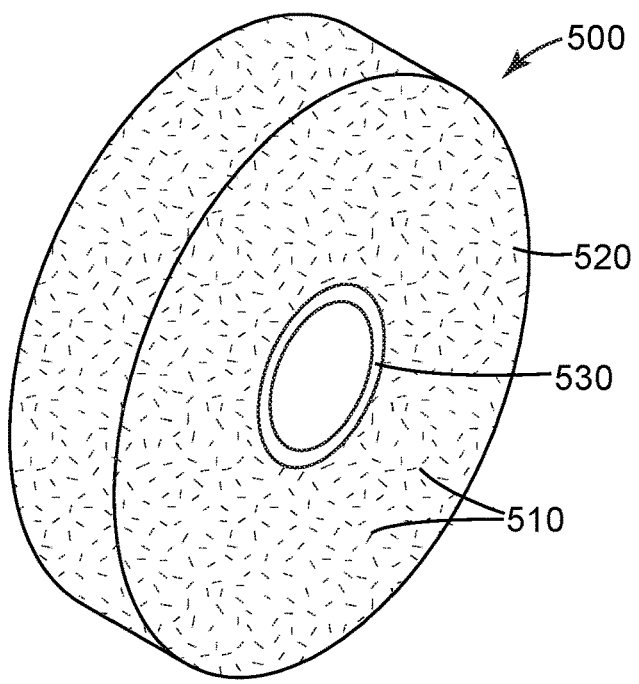
FIG. 5 is a schematic perspective view of a bonded abrasive wheel according to the present disclosure.

An exemplary grinding wheel is shown in FIG. 5. Referring now to FIG. 5, grinding wheel 500 is depicted, which includes elongated abrasive particles made according to the present disclosure 510 in a binder material 520 (e.g., an organic binder or a vitreous binder), molded into a wheel and mounted on hub 530.

Suitable organic binders for making bonded abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the desired properties. The coupling agents can improve adhesion to the elongated abrasive particles and/or filler. The binder chemistry may be thermally cured, radiation cured or combinations thereof. Additional details on binder chemistry may be found in U.S. Pat. No. 4,588,419 (Caul et al.); U.S. Pat. No. 4,751,138 (Tumey et al.), and U.S. Pat. No. 5,436,063 (Follett et al.).

Vitreous binders, which exhibit an amorphous structure and are typically hard, are well known in the art. In some cases, the vitreous binders include crystalline phases. Bonded, vitrified abrasive articles made according to the present disclosure may be in the shape of a wheel (including cut off wheels), honing stone, mounted pointed or other conventional bonded abrasive shape. In some embodiments, a vitrified bonded abrasive article made according to the present disclosure is in the form of a grinding wheel.

Vitreous binders can be made by heating various of metal oxides such as, for example, silica, silicates, alumina, soda, calcia, potassia, titania, iron oxide, zinc oxide, lithium oxide, magnesia, boria, aluminum silicate, borosilicate glass, lithium aluminum silicate, and combinations thereof. Typically, vitreous binders can be formed from compositions comprising from 10 to 100 percent of glass frit, although more typically the composition comprises 20 to 80 percent of glass frit, or 30 to 70 percent of glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the binder (also known as "bond") is matured depends, for example, on the particular bond chemistry.

In some embodiments, vitrified binders include those comprising silica, alumina (desirably, at least 10 percent by weight alumina), and boria (desirably, at least 10 percent by weight boria). In most cases, the vitrified bonding material further comprises alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for the present disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g.; talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present disclosure to use a combination of different grinding aids, and in some instances this may produce a synergistic effect.

Bonded abrasive articles can contain 100 percent elongated abrasive particles according to the present disclosure, or blends of such abrasive particles with other abrasive particles and/or diluent particles. However, at least about 2 percent by weight, desirably at least about 5 percent by weight, and more desirably about 30 to 100 percent by weight, of the abrasive particles in the abrasive articles should be elongated abrasive particles made according to the present disclosure. In some instances, the elongated abrasive particles made according to the present disclosure may be blended with other abrasive particles and/or diluent particles at a ratio between 5 to 75 percent by weight, about 25 to 75 percent by weight, about 40 to 60 percent by weight, or about 50 to 50 percent by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, abrasive agglomerates, and combinations thereof. In some instances, a blend of abrasive particles may result in a bonded abrasive article that exhibits improved grinding performance in comparison with bonded abrasive articles comprising 100 percent of either type of abrasive particle. If there is a blend of abrasive particles, the abrasive particle types forming the blend may be of the same size. Alternatively, the abrasive particle types may be of different particle sizes.

Examples of suitable diluent particles include marble, gypsum, flint, silica, iron oxide, aluminum silicate, glass (including glass bubbles and glass beads), alumina bubbles, alumina beads and diluent agglomerates.

The abrasive particles may be uniformly distributed in the abrasive article or concentrated in selected areas or portions of the abrasive article. For example, in a bonded abrasive, there may be two distinct sections of the grinding wheel. The outermost section may comprise abrasive particles made according to the present disclosure, whereas the innermost section does not. Alternatively, elongated abrasive particles made according to the present disclosure may be uniformly distributed throughout the bonded abrasive article. Further details regarding resin bonded abrasive articles can be found, for example, in U.S. Pat. No. 4,543,107 (Rue); U.S. Pat. No. 4,741,743 (Narayanan et al.); U.S. Pat. No. 4,800,685 (Haynes et al.); U.S. Pat. No. 4,898,597 (Hay et al.); U.S. Pat. No. 4,997,461 (Markhoff-Matheny et al.); U.S. Pat. No. 5,037,453 (Narayanan et al.); U.S. Pat. No. 5,110,332 (Narayanan et al.); and U.S. Pat. No. 5,863,308 (Qi et al.). Further details regarding vitreous bonded abrasives can be found, for example, in U.S. Pat. No. 4,543,107 (Rue); U.S. Pat. No. 4,898,597 (Hay et al.); U.S. Pat. No. 4,997,461 (Markhoff-Matheny et al.); U.S. Pat. No. 5,094,672 (Giles Jr. et al.); U.S. Pat. No. 5,118,326 (Sheldon et al.); U.S. Pat. No. 5,131,926 (Sheldon et al.); U.S. Pat. No. 5,203,886 (Sheldon et al.); U.S. Pat. No. 5,282,875 (Wood et al.); U.S. Pat. No. 5,738,696 (Wu et al.), and U.S. Pat. No. 5,863,308 (Qi).

SELECT EMBODIMENTS OF THE PRESENT DISCLOSURE

In a first embodiment, the present disclosure provides a method of making elongated abrasive particles, the method comprising:

providing a mold having parallel linear grooves, wherein the parallel linear grooves are partially interrupted at predetermined intervals by transverse obstructions;

filling at least a portion of the parallel linear grooves with a flowable abrasive particle precursor composition, wherein the flowable abrasive particle precursor composition is confined within at least one of the parallel linear grooves;

at least partially drying the flowable abrasive particle precursor composition to form an at least partially dried abrasive particle precursor composition;

separating the at least partially dried abrasive particle precursor composition from the mold, thereby forming elongated precursor abrasive particles having a shape corresponding to portions of the parallel linear grooves disposed between the transverse obstructions, wherein the predetermined intervals correspond to lengths of the elongated precursor abrasive particles, and wherein at least one of the first and second opposite ends of the elongated precursor abrasive particles comprises both a molded portion and a fractured portion; and converting the elongated precursor abrasive particles into the elongated abrasive particles.

In a second embodiment, the present disclosure provides a method according to the first embodiment, wherein the parallel linear grooves that are at least partially defined by at least two planar surfaces, and wherein the parallel linear grooves are partially interrupted at predetermined intervals by transverse obstructions extending from at least one of the at least two planar surfaces.

In a third embodiment, the present disclosure provides a method according to the first or second embodiment, wherein said converting comprises: optionally calcining; and sintering.

In a fourth embodiment, the present disclosure provides a method according to any one of the first to third embodiments, wherein the parallel linear grooves that are at least partially defined by two planar surfaces.

In a fifth embodiment, the present disclosure provides a method according to any one of the first to third embodiments, wherein each of the parallel linear grooves is defined by two planar surfaces.

In a sixth embodiment, the present disclosure provides a method according to any one of the first to fifth embodiments, wherein both of the first and second opposite ends of the elongated abrasive particles comprise both a molded portion and a fractured portion.

In a seventh embodiment, the present disclosure provides a method according to any one of the first to sixth embodiments, wherein the fractured portions comprise projections.

In an eighth embodiment, the present disclosure provides a method according to any one of the first to seventh embodiments, wherein the elongated abrasive particles comprise alpha alumina.

In a ninth embodiment, the present disclosure provides a method according to any one of the first to eighth embodiments, wherein the flowable abrasive particle precursor composition comprises a boehmite dispersion.

In a tenth embodiment, the present disclosure provides a method according to any one of the first to ninth embodiments, wherein the transverse obstructions are bifurcated.

In an eleventh embodiment, the present disclosure provides elongated abrasive particles comprising a ceramic body bounded by at least two longitudinally-oriented contiguous surfaces, and first and second ends separated by the at least two longitudinally-oriented surfaces, wherein at least one of the first and second ends comprises both a molded portion and a fractured portion.

In a twelfth embodiment, the present disclosure provides elongated abrasive particles according to the eleventh embodiment, wherein the elongated abrasive particles comprise alpha alumina.

In a thirteenth embodiment, the present disclosure provides elongated abrasive particles according to the eleventh or twelfth embodiment, wherein the at least two longitudinally-oriented contiguous surfaces comprise three or four longitudinally-oriented surfaces.

In a fourteenth embodiment, the present disclosure provides elongated abrasive particles according to any one of the eleventh to thirteenth embodiments, wherein the elongated abrasive particles have a substantially triangular or trapezoidal transverse cross-section.

In a fifteenth embodiment, the present disclosure provides elongated abrasive particles according to any one of the eleventh to fourteenth embodiments, wherein both of the first and second opposite ends of the elongated abrasive particles comprise both a molded portion and a fractured portion.

In a sixteenth embodiment, the present disclosure provides elongated abrasive particles according to any one of the eleventh to fifteenth embodiments, wherein the fractured portions comprise projections.

In a seventeenth embodiment, the present disclosure provides elongated abrasive particles according to any one of the eleventh to sixteenth embodiments, wherein the elongated abrasive particles have a length to width ratio of at least 2.

In an eighteenth embodiment, the present disclosure provides elongated abrasive particles according to any one of the eleventh to seventeenth embodiments, wherein elongated abrasive particles conform to an abrasives industry specified nominal grade.

In a nineteenth embodiment, the present disclosure provides elongated abrasive particles according to any one of the eleventh to eighteenth embodiments retained in at least one binder.

In a twentieth embodiment, the present disclosure provides elongated abrasive particles according to any one of the eleventh to nineteenth embodiments, wherein the abrasive article comprises a bonded abrasive article.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Example 1

A sample of boehmite sol-gel was made using the following recipe: 1600 parts of DISPERAL aluminum oxide monohydrate powder (Sasol North America Inc., Houston, Tex.) was dispersed by high shear mixing a solution containing 2400 parts of deionized water and 72 parts of 70% aqueous nitric acid. The resulting sol-gel was aged for 1 hour. The sol-gel was forced into a polypropylene tool containing parallel linear grooves (width at top 1.15 mm, depth 1.00 mm, width at bottom 0.15 mm) interrupted by obstructions (i.e., 0.917 mm height walls) spaced at regular intervals of 2.75 mm) as shown in FIG. 2. The obstructions did not extend to the same vertical height as the walls of the grooves.

Figure 3C:
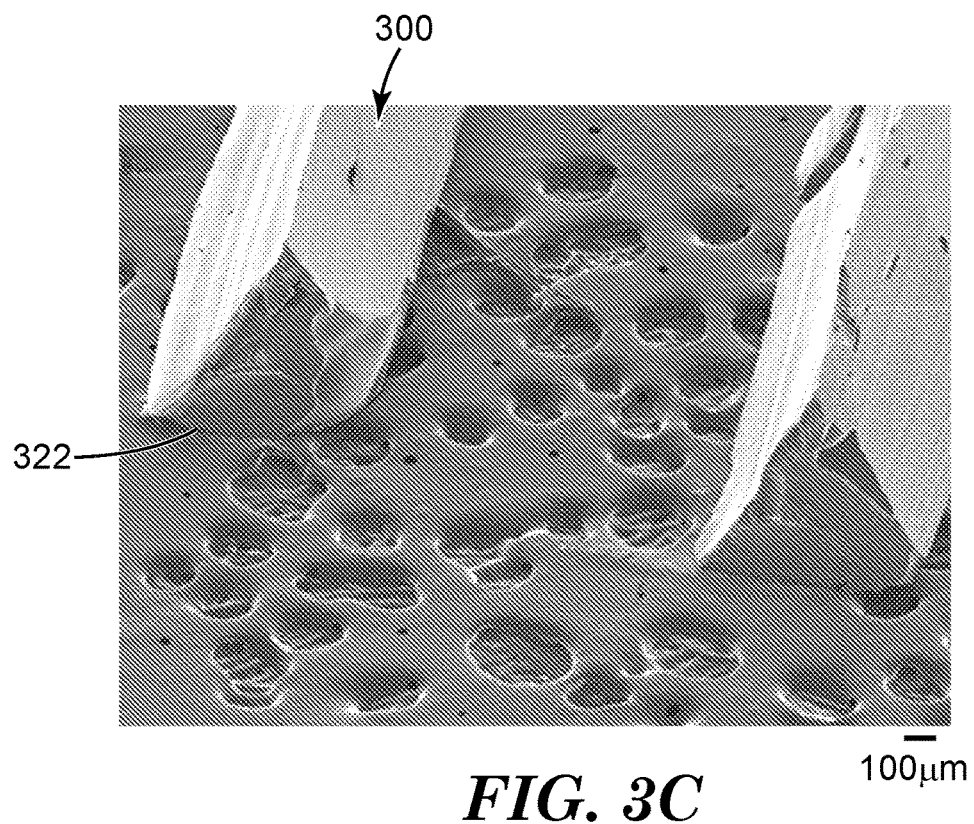
FIG. 3C is a higher magnification scanning electron micrograph of end 322 in FIG. 3A.

Prior to forcing the gel into the propylene tooling, a topical coating of peanut oil obtained by brushing about 2 grams of a 1 percent by weight peanut oil solution in methanol onto sheet which had dimension of about 10 inches×36 inches (25 cm×91 cm). The sol-gel was spread to the sheet using a putty knife so that the grooves were completely filled. The sheet containing the sol-gel was then air dried for two hours. Following drying, the sheet was shaken to dislodge the resulting precursor shaped particles. Representative elongated precursor abrasive particles thus obtained are shown in FIGS. 3A-3C.

The elongated precursor abrasive particles were calcined by heating them to approximately 650 degrees Celsius (° C.) in air for 15 minutes, then saturated with a mixed nitrate solution of the following concentrations (reported as oxides): 1.8 percent each of MgO, $Y_2O_3$, $Nd_2O_3$ and $La_2O_3$. The excess nitrate solution was removed, and the saturated precursor shaped abrasive particles were allowed to dry after which the particles were again calcined at 650° C., and then sintered at approximately 1400° C. Both the calcining and sintering was performed using rotary tube kilns. Representative elongated abrasive particles produced by the above method are shown in FIGS. 4A and 4B. Note that the frangible pieces are absent from the sintered abrasive particles, essentially broken-off during processing and firing of the precursor particles. The remaining particles were of consistent lengths.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making elongated abrasive particles, the method comprising:
    providing a mold having parallel linear grooves, wherein the parallel linear grooves are partially interrupted at predetermined intervals by transverse obstructions;
    filling at least a portion of the parallel linear grooves with a flowable abrasive particle precursor composition, wherein the flowable abrasive particle precursor composition is confined within at least one of the parallel linear grooves;
    at least partially drying the flowable abrasive particle precursor composition to form an at least partially dried abrasive particle precursor composition;
    separating the at least partially dried abrasive particle precursor composition from the mold, thereby forming elongated precursor abrasive particles having a shape corresponding to portions of the parallel linear grooves disposed between the transverse obstructions, wherein the predetermined intervals correspond to lengths of the elongated precursor abrasive particles, and wherein at least one of the first and second opposite ends of the elongated precursor abrasive particles comprises both a molded portion and a fractured portion; and
    converting the elongated precursor abrasive particles into the elongated abrasive particles.

2. The method of claim 1, wherein the parallel linear grooves that are at least partially defined by at least two planar surfaces, and wherein the parallel linear grooves are partially interrupted at predetermined intervals by transverse obstructions extending from at least one of the at least two planar surfaces.

3. The method of claim 1, wherein said converting comprises sintering.

4. The method of claim 1, wherein said converting comprises calcining and sintering.

5. The method of claim 1, wherein each of the parallel linear grooves is at least partially defined by two planar surfaces.

6. The method of claim 1, wherein each of the parallel linear grooves is defined by two planar surfaces.

7. The method of claim 1, wherein both of the first and second opposite ends of the elongated abrasive particles comprise both a molded portion and a fractured portion.

8. The method of claim 1, wherein the fractured portions comprise projections.

9. The method of claim 1, wherein the elongated abrasive particles comprise alpha alumina.

10. The method of claim 1, wherein the flowable abrasive particle precursor composition comprises a boehmite dispersion.

11. The method of claim 1, wherein the transverse obstructions are bifurcated.

12. Elongated abrasive particles comprising a ceramic body bounded by at least two longitudinally-oriented contiguous surfaces, and first and second ends separated by the at least two longitudinally-oriented surfaces, wherein at least one of the first and second ends comprises both a molded portion and a fractured portion.

13. The elongated abrasive particles of claim 12, wherein the elongated abrasive particles comprise alpha alumina.

14. The elongated abrasive particles of claim 12, wherein the at least two longitudinally-oriented contiguous surfaces comprise three or four longitudinally-oriented surfaces.

15. The elongated abrasive particles of claim 12, wherein the elongated abrasive particles have a substantially triangular or trapezoidal transverse cross-section.

16. The elongated abrasive particles of claim 12, wherein both of the first and second opposite ends of the elongated abrasive particles comprise both a molded portion and a fractured portion.

17. The elongated abrasive particles of claim 12, wherein the fractured portions comprise projections.

18. The elongated abrasive particles of claim 12, wherein elongated abrasive particles conform to an abrasives industry specified nominal grade.

\* \* \* \* \*